(12) United States Patent
Lazarev et al.

(10) Patent No.: US 7,297,209 B2
(45) Date of Patent: Nov. 20, 2007

(54) METHOD AND DEVICE FOR TRANSFERRING ANISOTROPIC CRYSTAL FILM FROM DONOR TO RECEPTOR, AND THE DONOR

(75) Inventors: Pavel I. Lazarev, Belmont, CA (US); Michael V. Paukshto, San Mateo, CA (US)

(73) Assignee: Nitto Denko Corporation, Osaka (JP)

( * ) Notice: Subject to any disclaimer, the term of this patent is extended or adjusted under 35 U.S.C. 154(b) by 477 days.

(21) Appl. No.: 10/741,692

(22) Filed: Dec. 18, 2003

(65) Prior Publication Data

US 2005/0136345 A1    Jun. 23, 2005

(51) Int. Cl.
C30B 33/00 (2006.01)
(52) U.S. Cl. ............... 117/1; 117/54; 117/915
(58) Field of Classification Search .......... 117/1, 117/54, 915
See application file for complete search history.

(56) References Cited

U.S. PATENT DOCUMENTS

| | | | |
|---|---|---|---|
| 4,378,264 A | 3/1983 | Pilette et al. | |
| 5,069,533 A | 12/1991 | Yuasa et al. | |
| 5,506,189 A | 4/1996 | Chou et al. | |
| 5,512,126 A | 4/1996 | Kannabiran et al. | |
| 5,550,660 A | 8/1996 | Yang | |
| 5,578,824 A * | 11/1996 | Koguchi et al. | 250/318 |
| 5,693,446 A | 12/1997 | Staral et al. | |
| 5,885,490 A | 3/1999 | Kawaguchi et al. | |
| 5,993,600 A | 11/1999 | Ueda et al. | |
| 6,210,509 B1 | 4/2001 | Sommerfeldt et al. | |
| 6,331,882 B1 * | 12/2001 | Shimodaira et al. | 349/122 |
| 6,455,172 B1 | 9/2002 | Yano et al. | |
| 6,463,981 B1 | 10/2002 | Kerr | |
| 6,531,195 B2 | 3/2003 | Negoro et al. | |
| 6,551,434 B1 | 4/2003 | Yamada et al. | |
| 6,554,044 B2 | 4/2003 | Paulson et al. | |
| 6,563,640 B1 | 5/2003 | Ignatov et al. | |
| 6,576,149 B1 | 6/2003 | Matsuzawa | |
| 6,630,289 B1 * | 10/2003 | Kwok et al. | 430/321 |
| 6,855,384 B1 * | 2/2005 | Nirmal et al. | 428/32.6 |
| 2005/0041213 A1 * | 2/2005 | Paukshto | 353/20 |

FOREIGN PATENT DOCUMENTS

WO    WO 01/63346 A1    8/2001
WO    WO 03/067312 A2    8/2003

OTHER PUBLICATIONS

Ignatov et al. "Thin Crystal Film polarizers and retarders", Proceedings of SPIE vol. 4658 (2002) pp. 79-90.*
Bobrov, Y. et al., "Thin film polarizers for liquid crystal displays", Proceedings of SPIE, vol. 4511 (2001), pp. 133-140.

* cited by examiner

Primary Examiner—Yogendra M. Gupta
Assistant Examiner—Matthew J. Song
(74) Attorney, Agent, or Firm—Westerman, Hattori, Daniels & Adrian, LLP

(57) ABSTRACT

A method of forming an anisotropic crystal film, comprising providing a donor which comprises a base and an anisotropic crystal film bounded to the base, and a receptor. At least a portion of the anisotropic crystal film is placed in contact with the receptor. A loading is applied to at least a portion of the base, whereby providing shear and compressive stresses onto the donor and receptor, and transferring at least a portion of the anisotropic crystal film onto the receptor and delaminating the at least portion of the anisotropic crystal film from the base.

25 Claims, 18 Drawing Sheets

METHOD AND DEVICE FOR TRANSFERRING ANISOTROPIC CRYSTAL FILM FROM DONOR TO RECEPTOR, AND THE DONOR

FIELD OF THE INVENTION

The invention pertains to the field of fabricating anisotropic films. In particular, the invention relates to methods and devices for transferring anisotropic crystal films from a donor plate to a receptor plate.

BACKGROUND OF THE INVENTION

There are known optically anisotropic crystal films, which are obtained from polycyclic organic compounds via special fabrication operations and therefore feature high degree of anisotropy, thermal and light resistance. Technology of fabricating the above films is relatively simple; however it requires special equipment and precise compliance with the fabrication conditions in order to provide reproducibility of parameters of films. During fabrication of light, indicatory and other devices, which mainly represents assembly of already prefabricated parts, it is sometimes difficult to incorporate an additional fabrication process to produce films and parts based on the above films. Additional challenges arise when one needs to fabricate anisotropic coatings with complex configurations or with small pattern features. Usually in this case one forms a continuous anisotropic coating via the known methods and then later removes certain portions of the coating. For example, there is a known method of removing portions of the coating using scotch tape. The scotch tape is adhered to the areas of the film to be stripped of the coating, and after the tape is peeled the remaining coating on the substrate has the desired configuration. This known technique does not require special equipment, however, it does not provide sufficiently sharp edge of the coating and the degree of anisotropy at the edges of the remaining regions, and it is not reproducible enough to obtain elements of small sizes. Another difficulty is the possible decrease in the degree of crystalline order due to the application of various compressive and shear stresses to the anisotropic crystal film. Also the roughness of the surface of the anisotropic crystal film can be increased when the scotch is peeled off.

In order to fabricate polarizing coatings with the desired configuration one may also use a patterned layer of water-soluble lacquer. After solidifying the lacquer the exposed polarizing coating is washed off with a suitable solvent (water or a mixture of water with and organic solvent). However, this method also requires carrying out several additional fabrication operations (installation of an additional fabrication station), and implementation of this method may raise difficulties in selecting suitable chemical agents (suitable composition of the lacquer for polarizing coating, solvent to remove the protective lacquer, etc.).

Technology has been developed which allows avoiding installation of special fabrication processes for producing polarizing films, obtained from organic dyes, with various configurations [Staral et al., U.S. Pat. No. 5,693,446]. This technology is based on using pre-fabricated polarizing films on a base, the so-called donors. This technology involves the known methods of mass transfer as a result of localized heating of the coating areas to be transferred [Chou et al., U.S. Pat. No. 5,506,189]. Heating may be implemented via thermal elements, and laser radiation, etc. This method allows obtaining polarizing coating of an arbitrary shape with high resolution of the pattern.

Difficulties arising in implementation of this method are related firstly to the structure of the transferring polarizing coating and the possible degradation of optical characteristics of the coating when it is locally heated up to the temperature necessary to carry out the transfer. Polarizing coating is obtained from lyotropic liquid crystal (LLC) dyes, molecules of which aggregate into supramolecular complexes. After application of LLC onto the substrate and inflicting the external shearing force supramolecular complexes become aligned in the direction of the influence. After the film dries (removal of the solvent), alignment of molecules is conserved. Therefore the crystalline order obtained from the lyotropic liquid crystal is conserved as well.

The anisotropy of optical, magnetic, or electric properties, the polarizing properties of the anisotropic crystal film is related to the crystalline order. The heating applied to the anisotropic crystal film potentially decreases the crystalline order, and thus the anisotropic properties are deteriorated as well. The risk to destroy the crystalline order with the heating could be substantially increased with particular material, increase of temperature, state of anisotropic crystal film, ambient conditions etc. Therefore the use of heating is generally undesirable for the technology.

Another possible solution is preliminary activation, i.e. preliminary influence onto the transferring areas of the film such as to weaken bonds between molecules or supramolecular complexes in the structure thereby providing the transfer of areas of the film from the donor plate to the receptor plate at significantly lower pressure. This does not result in degradation of anisotropy in the bulk material, and in the edges of the patterns.

Besides of general complexity, both heating and activation facilitated transfer technologies suffer from the roughness produced by the peel-off of the donor film performed after the transfer.

The peel-off stress comprises an expansion component and a shear component. Both components disturb the oriented molecules in the anisotropic crystal film. The disturbance comprises the deviation of the molecules' dipoles from the surface plane, thus producing the extensive distortion of the layer of the anisotropic crystal film material adhered to the surface. In particular, optical, magnetic, electrical, ferromagnetic and any other properties can be disturbed.

On the other hand, the production of the anisotropic crystal film with precisely pre-defined thickness is a complicated task when the film has to be produced directly from the solution of the polycyclic organic compound. Thus the thickness is adjusted using the multiple identical anisotropic crystal films with various thicknesses. This is possible since the order of the magnitude of anisotropic crystal film thickness can be varied in the extremely wide range from tenths nanometers to hundreds microns. It is desirable to remove all defects from the interface between films in order to obtain the homogenous film. It is desirable that the films' interfaces are reseated as well, because any traces of the interface boundary produce the interference effects and make worse optical properties. The peel-off disturbance described hereinbefore could substantially affect the properties of the multilayer film, additionally producing the interface effects.

SUMMARY OF THE INVENTION

The present invention provides a method of fabrication of an anisotropic crystal film on a receptor via transfer from a donor. The present method can maintain the alignment of the surface layer of the anisotropic crystal film transferred from the donor to the receptor. The present method can be used to manufacture patterned multilayer anisotropic crystal film of any given thickness in the range of about tenths nanometers to tenths microns. The anisotropic crystal film can be initially prepared from a solution of a polycyclic organic compound.

The present method comprises providing a donor which comprises a base and an anisotropic crystal film bounded to the base, and a receptor. At least a portion of the anisotropic crystal film is placed in contact with the receptor. A loading is applied to at least a portion of the base, whereby providing shear and compressive stresses onto the donor and receptor, and transferring at least a portion of the anisotropic crystal film onto the receptor and delaminating the at least portion of the anisotropic crystal film from the base.

BRIEF DESCRIPTION OF THE DRAWINGS

The invention will be more clearly understood from the following description when read in conjunction with the accompanying drawings in which.

DETAILED DESCRIPTION OF INVENTION

The present invention provides a method of transferring an anisotropic crystal film from a donor to a receptor. The method is useful in fabricating devices using anisotropic films as polarizers or retarders etc., such as liquid crystal displays (LCDs). The method of the invention is also useful in fabrication of materials and products for automotive industry, architecture, and applied art.

In general, the method of the invention transfers an anisotropic crystal film from a donor to a receptor. The donor comprises an anisotropic crystal film and a base that serves as a mechanical base for the anisotropic film. A loading is applied to at least a portion of the base to provide shear and compressive stresses onto the base and anisotropic crystal films and the receptor, thereby transferring at least a portion of the anisotropic crystal film onto the receptor. The base is delaminated from the anisotropic crystal film transferred to the receptor. The level of the lording is controlled so that the applied stresses are sufficient for transfer of the anisotropic crystal film from the donor to the receptor but do not disrupt the crystalline structure of the transferred anisotropic crystal film.

The donor is placed in the contact with the receptor. The anisotropic crystal film is positioned between the base and the receptor. The contact of the anisotropic crystal film with the receptor produces the adhesive bonds between these films, and the bonds could be enforced with the use of pretreatment of the contacting surfaces as described hereinafter. In one embodiment, the donor comprises interference multilayer structure.

An external loading is then applied to the outside surface of the base. The applied loading produces shear and compressive stresses in the base. Although the loading could be applied to a relatively small area, the base redistributes the stress and thus prevents the anisotropic crystal film from the orientation disturbance of the surface. The compressive stress increases the adhesive bonding between the anisotropic crystal film and the receptor. The shear stress breaks the adhesive bonding between the anisotropic crystal film and the base, since the shear strength is always much less than the expansion/compress strength.

Therefore, the transfer of at least a portion of the anisotropic crystal film from the donor to the receptor is performed with the subsequent fixing of the anisotropic crystal film on the receptor. Finally, the base could be delaminated.

The levels of the applied stresses are high enough in order to transfer at least a portion of the anisotropic crystal film from the donor to the receptor and are low enough in order to retain a crystalline structure of the anisotropic crystal film. The shear stress applied to the anisotropic crystal film provides an alignment effect, and thus enhances the anisotropic properties of the anisotropic crystal film.

Figure 1:
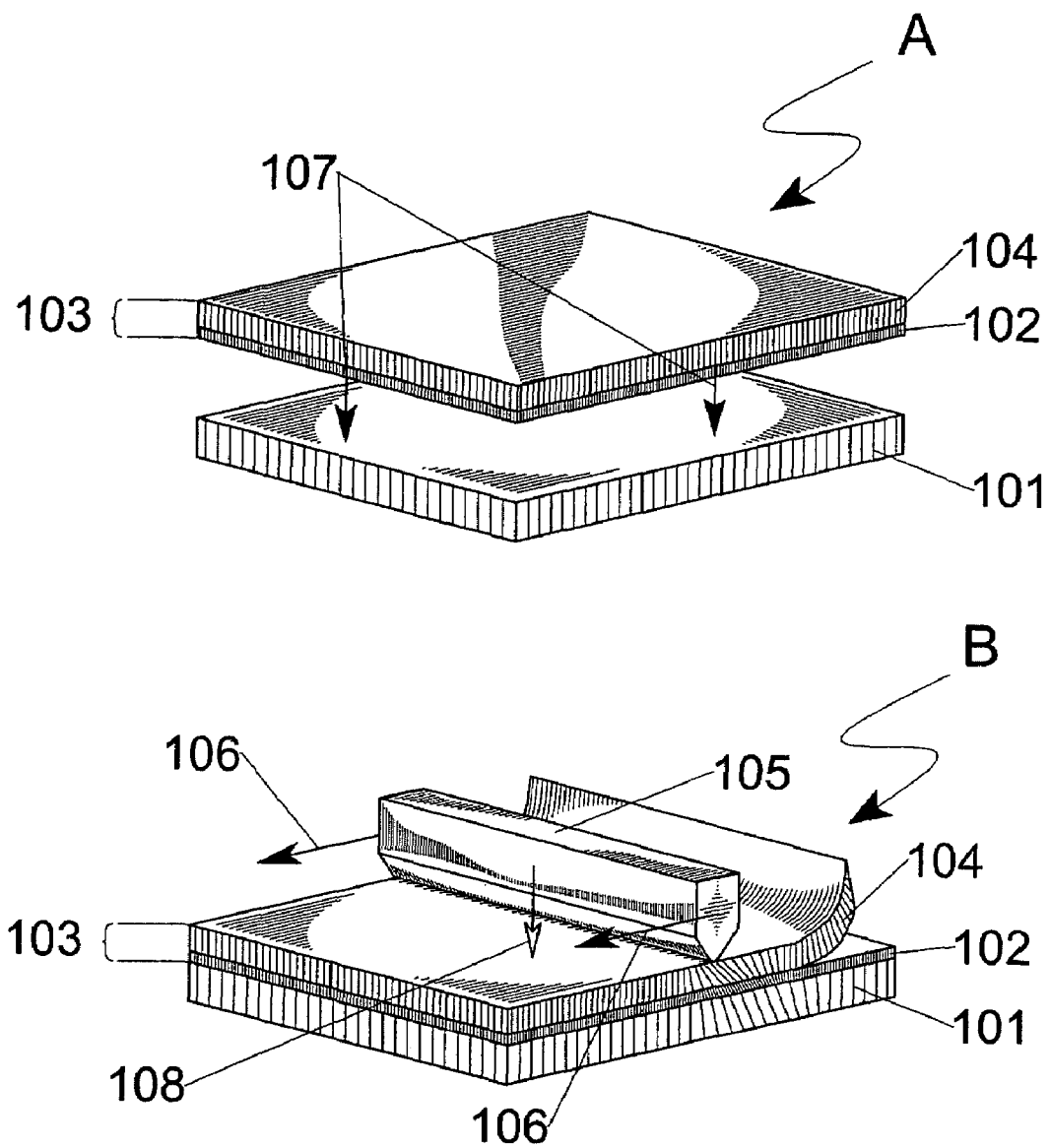
FIG. 1 schematically shows a method of fabrication of anisotropic crystal films using knife transfer according to one embodiment of the invention.

FIG. 1 schematically shows the main stages of the method of fabricating anisotropic crystal film 102 on a receptor 101 via the transfer from the donor 103.

FIG. 1A schematically shows the placement of the donor 103 into the contact with the receptor 101. The donor 103 comprises at least one anisotropic crystal film 102 to be transferred to the receptor 101. The base film 104 is the base for the anisotropic crystal film 102 and is the portion of the entire donor 103. The anisotropic crystal film 102 faces the receptor 101 when the donor 103 is moved in the direction 107 in order to be placed in contact with the receptor 101.

FIG. 1B schematically shows the transfer of the anisotropic crystal film 102 to the receptor 101. The knife 105 is used in FIG. 1B for illustrative purposes as a device for producing the shear and compressive loadings. Other devices can also be used as will be described below. The knife 105 presses the donor 103 and the receptor 101 as shown by arrow 108. Simultaneously the knife 105 is moved along the external surface of the donor 103 as shown by arrows 106. The described treatment creates the shear and compressive stress distribution in the donor 103 and forms the disclination on the boundary between the base film 104 and the anisotropic crystal film 102. The disclination causes delamination of the base film 104 from the anisotropic crystal film 102, as shown in FIG. 1B. The receptor 101 is fixed with the anisotropic crystal film 102. The combined effect of the shear and compressive loading produces the transfer of the anisotropic crystal film 102 from the donor 103 to the receptor 101. The value of the shear and the compressive stresses is sufficiently large to transfer at least a portion of the anisotropic crystal film. On the other hand, the value of the shear and compressive loading is controlled to not degrade the crystalline structure and consequently the optical parameters of the transferred anisotropic crystal film.

Figure 2:
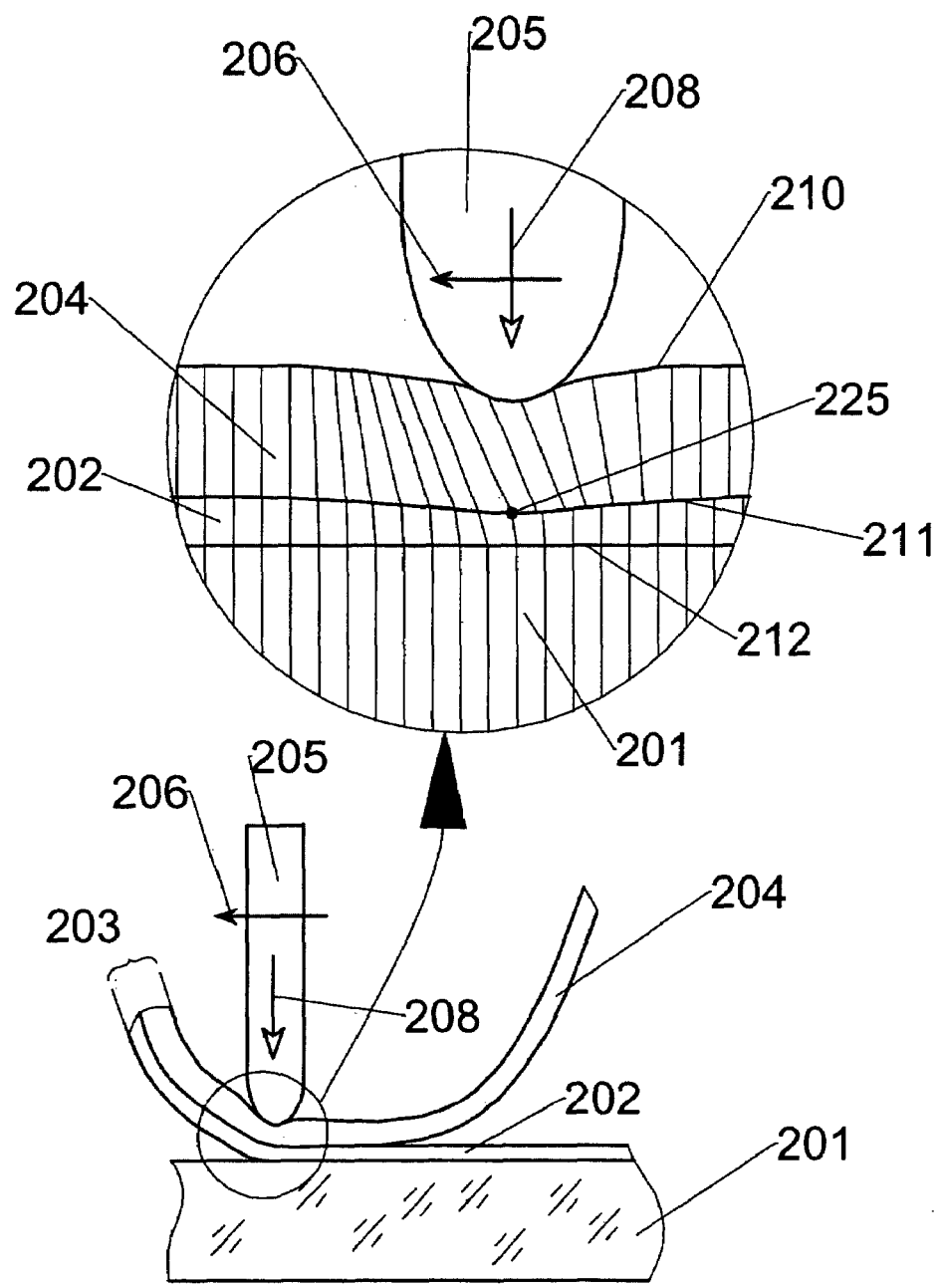
FIG. 2 schematically shows compressive and shear stresses applied to donor, receptor and anisotropic crystal films according to one embodiment of the invention.

FIG. 2 shows in more detail the transfer stage of the disclosed invention. The knife 205 is shown in more detail in FIG. 2 for illustrative purposes as a device for producing the shear and compressive stresses.

The knife 205 is moved along the external surface 210 of the donor 203. The knife 205 is pressed in the direction 208 from the donor 203 to the receptor 201, and the compressive stress is produced in this way. Simultaneously the knife 205 is moved in the direction 206, and produces the shear stress distribution in the donor 203 due to the friction. The friction exists between the knife 205 and the external surface 210 of the donor 203. The lines 211 and 212 designate the interfaces between the base film 204 and the anisotropic crystal film 202, and between the donor 203 and the receptor 201, respectively.

Microscopic area under the knife edge is shown in more detail inside the circle in the upper part of FIG. 2. The thickness of the base film 204 and the anisotropic crystal film 202 is reduced under the edge of the knife 205 due to the compressive strain produced by the compressive stress.

The hatching lines are used in order to illustrate the value and the direction of the strains. Since the compressive and shear loading produces the elastic deformation of the films 202, 201, 204, the strains shown in FIG. 2 are proportional to the stresses. The non-stressed portion of the films 201, 202 and 204 are shown with vertical hatching lines. The larger deviation of the hatching lines from the vertical line designates the larger value of shear strain in the hatched area. Further, the continuity of the hatching lines is used to describe the adhesive bonding between the receptor 201, anisotropic crystal film 202 and the base film 204. The hatching line is continued without break at the boundary 211 or 212 when the adhesive bond exists between the respective films. Otherwise, the discontinuity of the hatching line designates the break of the adhesive bond between films.

The anisotropic crystal film 202 is adhesively bonded to the base film 204 before the transfer. Once the donor 203 has been placed in contact with the receptor 201, the anisotropic crystal film 202 adhesively bonds to the receptor 201. Thus the hatching lines on the left side of the edge of the knife 205 continuously intersect both boundaries 211 and 212. The maximum shear strain exists in the area under and right after the knife 205 edge, therefore the hatching lines possesses the maximum slope immediately under and right after the knife 205. The slope decreases as the point inside film 202 or 204 moves away from the knife 205. The adhesive bonds between the receptor 201 and the anisotropic crystal film 202 is strong enough to overcome the applied shear stress, thus everywhere across the boundary 212 the hatching lines are continuous. On the other hand, the adhesive bond between the anisotropic crystal film 202 and the base film 204 is discontinuous at the point 225, and the portion of the base film 204 on the right side of the disclination point 225 is delaminated from the anisotropic crystal film 202, as shown by the discontinuity of the hatching lines.

The various embodiments of the disclosed invention are described hereinafter. The loadings can be applied in the different ways, and different devices can be used to apply loadings. Any different combinations of the loading devices can be employed. The desirable pre-treatments of the anisotropic crystal film, the base film and the receptor are shown, as well as the compressive pre-treatment of the seam between the films. Various additional layers can also be included in the donor or receptor such as adhesive, pressure-sensitive adhesive, layer with weak enough adhesion against shear stress, etc. In one embodiment the anisotropic crystal film comprises various fragments such as colored fragments, fragments with various polarization transmission axes, etc. The desirable embodiments are described with capabilities to transfer a portion of the anisotropic crystal film to the receptor. The disclosed fabrication method comprises embodiments with respect to the time order of the stages. In one desirable embodiment described hereinafter the anisotropic crystal film comprises thin crystal film. The disclosed invention is useful in the fabrication the multilayer films.

In one embodiment, the donor further comprises the interference multilayer structure. Under the interference multilayer structure we understand the structure comprising two or more layers, wherein the thicknesses of at least two layers in the structure are of the same order as the wavelength of the wavelength range under consideration. In one embodiment, the wavelength range is a visible wavelength range.

In one embodiment, the donor and the receptor are compressed towards each other. In another embodiment, the shear stress is applied along the interface surface of the anisotropic crystal film and the base. Both embodiments provide the loadings in the desired directions in order to facilitate the transfer and maintain the crystal structure of the anisotropic crystal film.

In one embodiment, the loading device is moved with respect to the donor and receptor. FIGS. 1 and 2 are the examples of the embodiment with the loading device moved with respect to the donor and the receptor.

Figure 3:
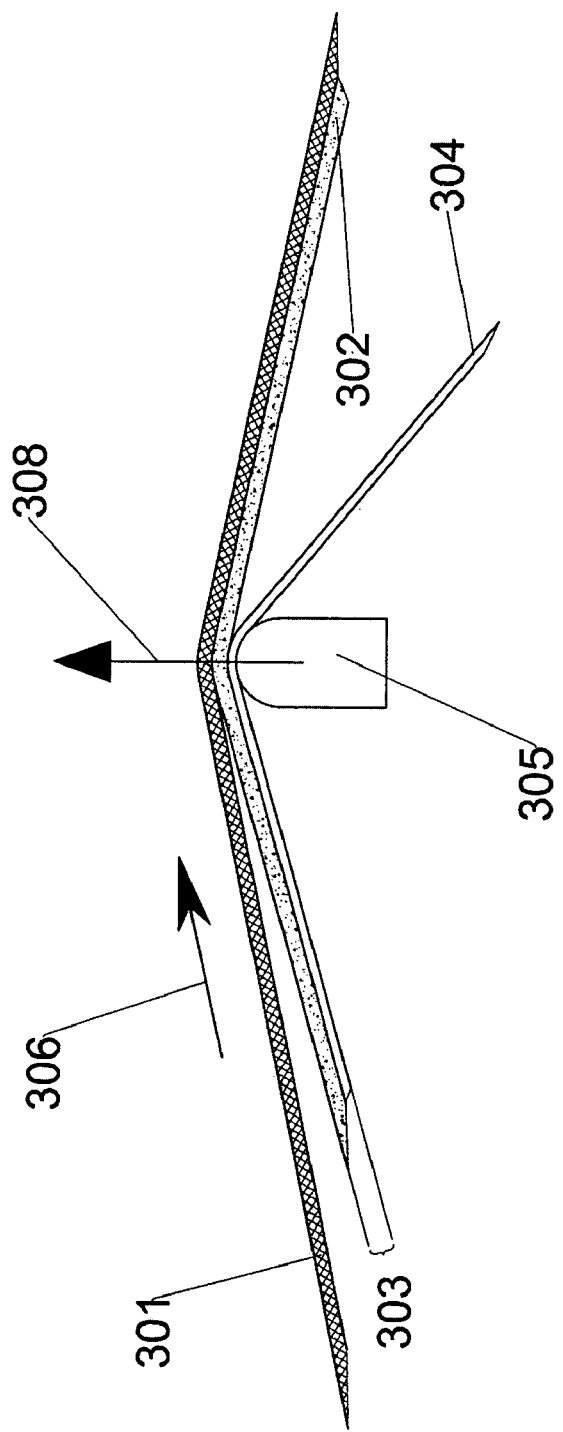
FIG. 3 schematically shows a donor and receptor are moved with respect to a stationary loading device according to one embodiment of the invention.

In another embodiment, the donor and receptor are moved with respect to the stationary loading device. FIG. 3 schematically shows the embodiment of this type. The donor 303 and the receptor 301 are moved in the direction 306 with respect to the stationary knife 305. The knife 305 is pressed in the direction 308 in order to produce compressive loading.

The combined effect of the movement 306 and the compressive stress 308 produce the desired shear stress.

The desired loadings are produced using the various loading devices. The loading device contacts the external surface of the base, and is pressed to the receptor to produce the compressive stress. Simultaneously, the loading device is shifted along the surface of the donor. The shear stress is produces using the movement due to the friction forces existing between the external surface of the donor and the loading device. For example, the loading devices include such as but limited to knifes with rounded blade, non-rotating or rotating rolls, blades, non-rotating or rotating balls, rules, doctors, and peel-off bars.

In one embodiment, the friction between the loading device and the donor does not move the internal parts of the loading device with respect to each other. FIGS. 1-3 show such embodiments using a knife 105, 205, 305 as the loading device.

In another embodiment, the friction between the loading device and the donor plate moves the internal parts of said loading device with respect to each other. Roll is a convenient general name for this type of the loading device. One advantage using roll as loading device is the independently adjustable shear and compressive stresses. The compressive stress is adjusted with the force loaded on the rotation axes of the roll. The shear stress is adjusted with the friction force between the roll and the external surface of the donor, and this friction is in turn adjusted using the various handicaps for the free rotation of the roll around its axis. Instead of transfer process itself, the shear stress adjustment is useful for many other purposes. For example, the appropriate selection of the friction force suppresses self-induced vibrations of the donor and receptor.

Figure 4:
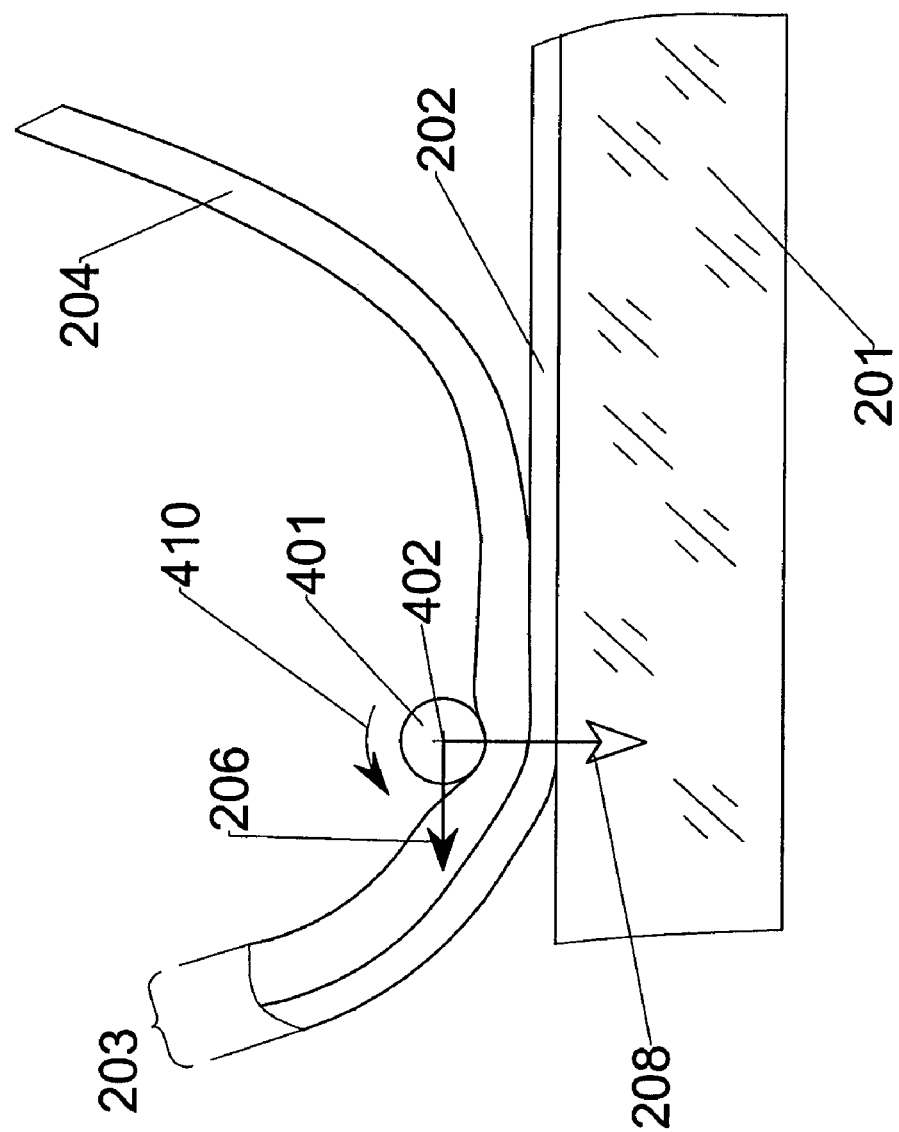
FIG. 4 schematically shows a roll used to produce compressive and the shear stresses according to one embodiment of the invention.

FIG. 4 shows an example of a roll as loading device. The axis 402 of the roll 401 moves in the direction 206. Simultaneously the roll 401 presses the external surface of the base film 204 in the direction 208. The roll 401 is rotated around the axis 402 in the direction 410, and the friction force between the roll 401 and the base film 204 produces the shear stress in the donor 203.

Various combinations of the knife and the roll loading devices can be used in the disclosed invention.

Figure 5:
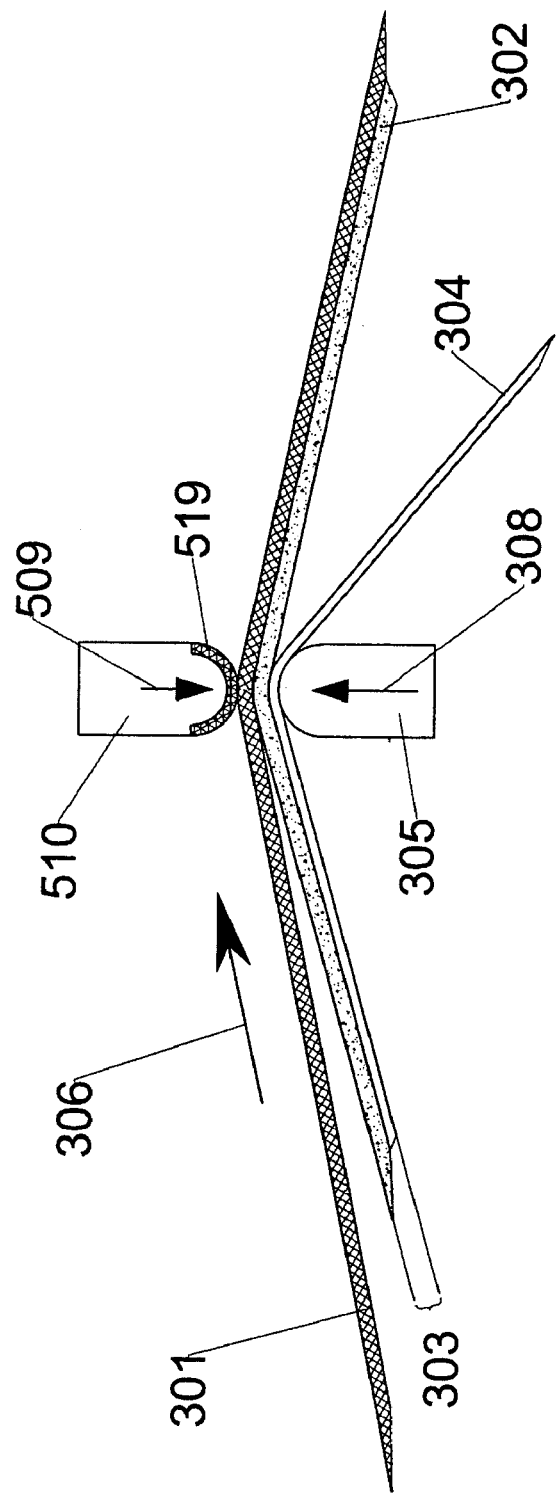
FIG. 5 schematically shows two knives used to produce compressive and shear stresses according to one embodiment of the invention.

FIG. 5 schematically shows an embodiment of the invention, said embodiment comprises two knives used to transfer the anisotropic crystal film 302 from the donor 303 to the receptor 301. The first knife 305 presses the external surface of the donor 303. The relative movement of the knife 305 and the donor 303 produces the shear stress. The second knife 510 is moved on the external surface of the receptor 301. The second knife 510 performs as a support of the receptor 301, thus both knives 305 and 510 are positioned opposite to each other. The shear stress produced by the second knife 510 in the receptor 301 is minimized using the antifriction arrangements applied between the rubbing surfaces of the second knife 510 and the receptor 301. Any known antifriction arrangement is applicable such as but not limited to the lubricant placed between the rubbing surfaces, the manufacturing of the rubbing parts from the lubricating material, the antifriction coating placed on the rubbing surface of the second knife 510 and/or receptor 301, the polishing of the rubbing surfaces, the decrease of the compressive force 509 applied to the second knife 510, etc. In the embodiment shown in FIG. 5, the antifriction coating 519 covers the edge of the second knife 510.

Figure 6:
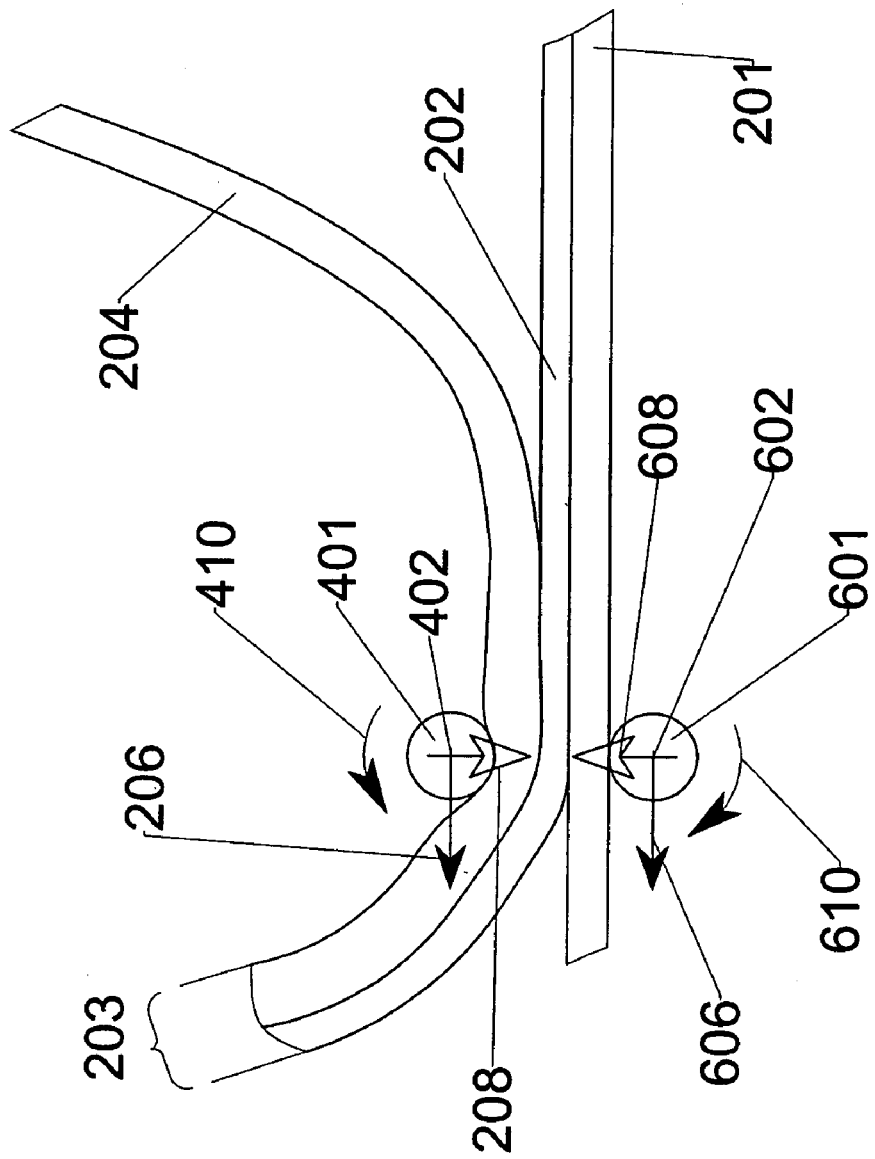
FIG. 6 schematically shows two rolls used to produce compressive and shear stresses according to one embodiment of the invention.

The embodiment of the disclosed invention with two rolls is shown schematically in FIG. 6. The second roll 601 serves as a support for the receptor 201 and is positioned opposite to the first roll 401. The friction between the roll 601 and the receptor 201 is minimized in order to avoid the shear stress of the receptor 201. Such a stress can produce undesirable delamination of the anisotropic crystal film 202 from the receptor 201. Therefore, the roll 601 freely rotates in the direction 610 around the axis 602. Simultaneously the axis 602 of the roll is moved in the direction 606, and the roll is pressed in the direction 608. The freedom of the rotation 602 gives the minimal friction of the receptor 201 and the roll 601.

The combination of the roll and the knife can be employed as well. In one embodiment, the roll and the knife are positioned opposite to each other. for example, the knife is moved along the external surface of the donor, and the roll is moved along the external surface of the receptor. In another embodiment the roll is moved along the external surface of the donor, and the knife is moved along the external surface of the receptor.

Figure 7:
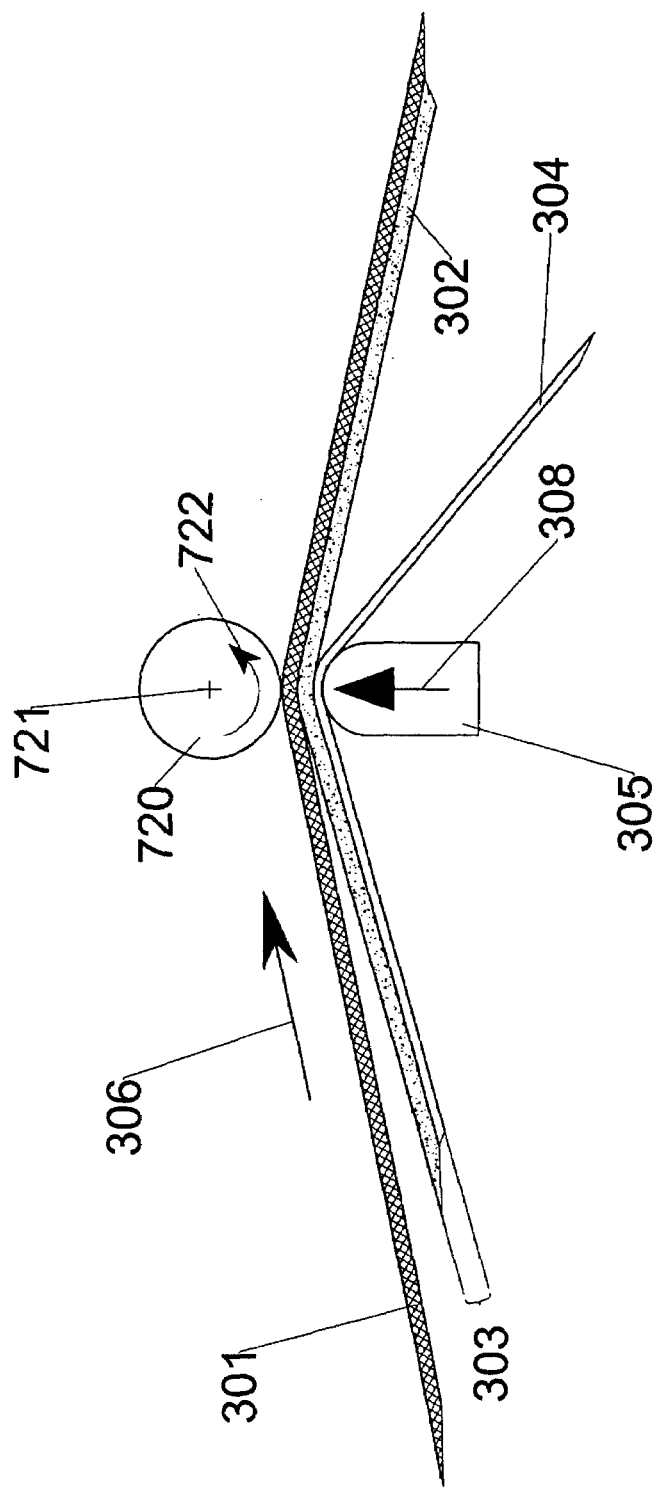
FIG. 7 schematically shows a knife presses on the external surface of a receptor and a roll presses on the external surface of a donor according to one embodiment of the invention.

One example of the embodiment is shown schematically in FIG. 7 wherein the knife presses the external surface of the donor and the roll presses the external surface of the receptor. The knife 305 is used to load the donor 303 moving in the direction 306, while the roll 720 bears the receptor 301. The roll 720 freely rotates around the axis 721 in the direction 722. Therefore the knife 305 loads the base film 304 with the shear stress, while the free rotation 722 of the roll 720 gives the purely compressive loading of the receptor 301.

The pre-treatment of the anisotropic crystal film or the receptor is used in the respective embodiments in order to increase the adhesive properties of the respective surfaces and facilitate the transfer of the anisotropic crystal film from the donor to the receptor. The pre-treatment is also a patterning method employed to facilitate the transfer of the fragments of the anisotropic crystal film. The embodiment comprising the pretreatment of the surface of the receptor employs t pretreatments such as but not limited to ion bombardment, vacuum cleaning, heating, mechanical treatment, electromagnetic irradiation, washing, and chemical modification. One or more of the described procedures can be employed in the pre-treatment in the preferable order.

Figure 8:
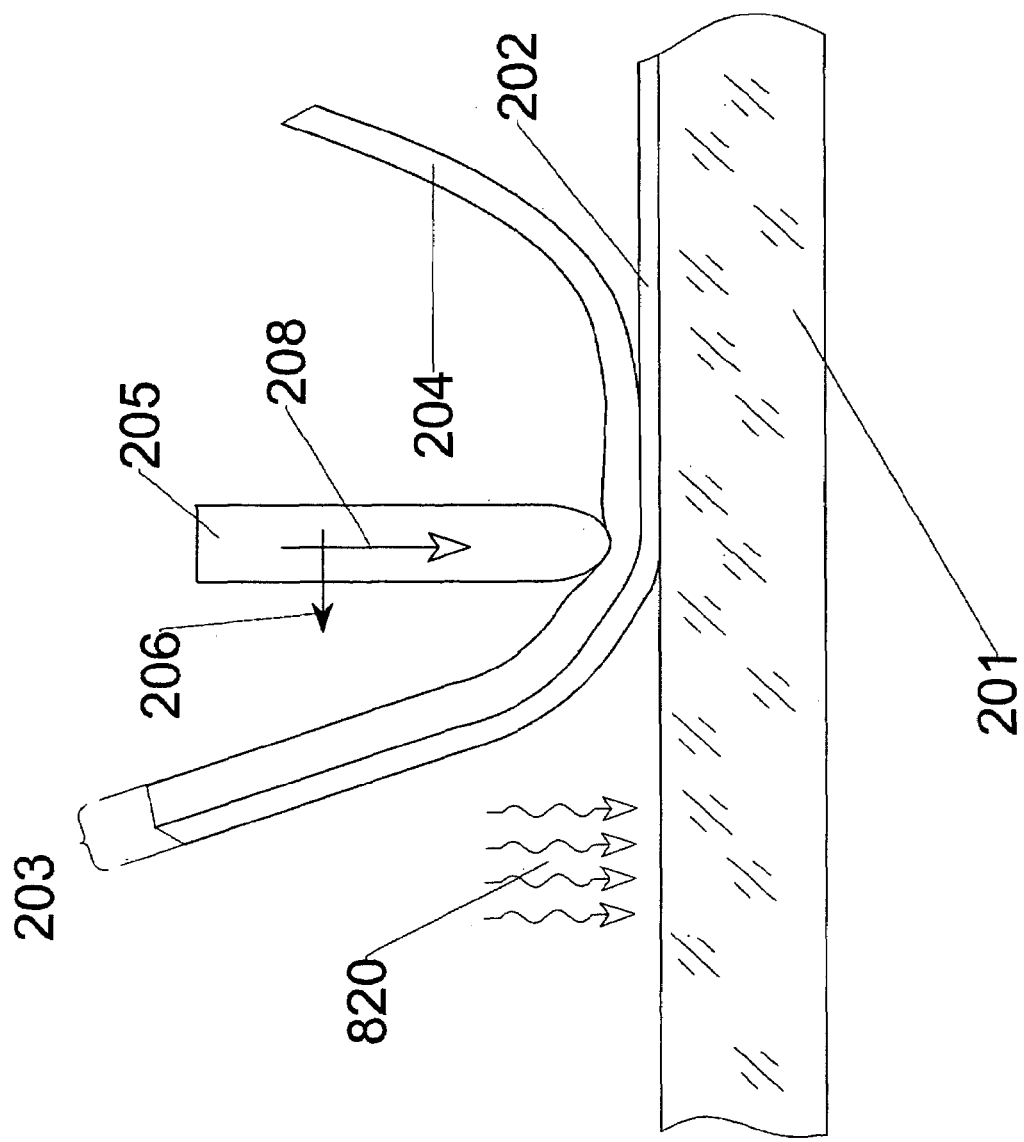
FIG. 8 schematically shows a fabrication method where the surface of a receptor is pretreated according to one embodiment of the invention.

FIG. 8 schematically shows the pretreatment of the surface of the receptor. The wave-shaped arrows 820 designate any of the described pretreatment applied to the surface of the receptor 201.

Figure 9:
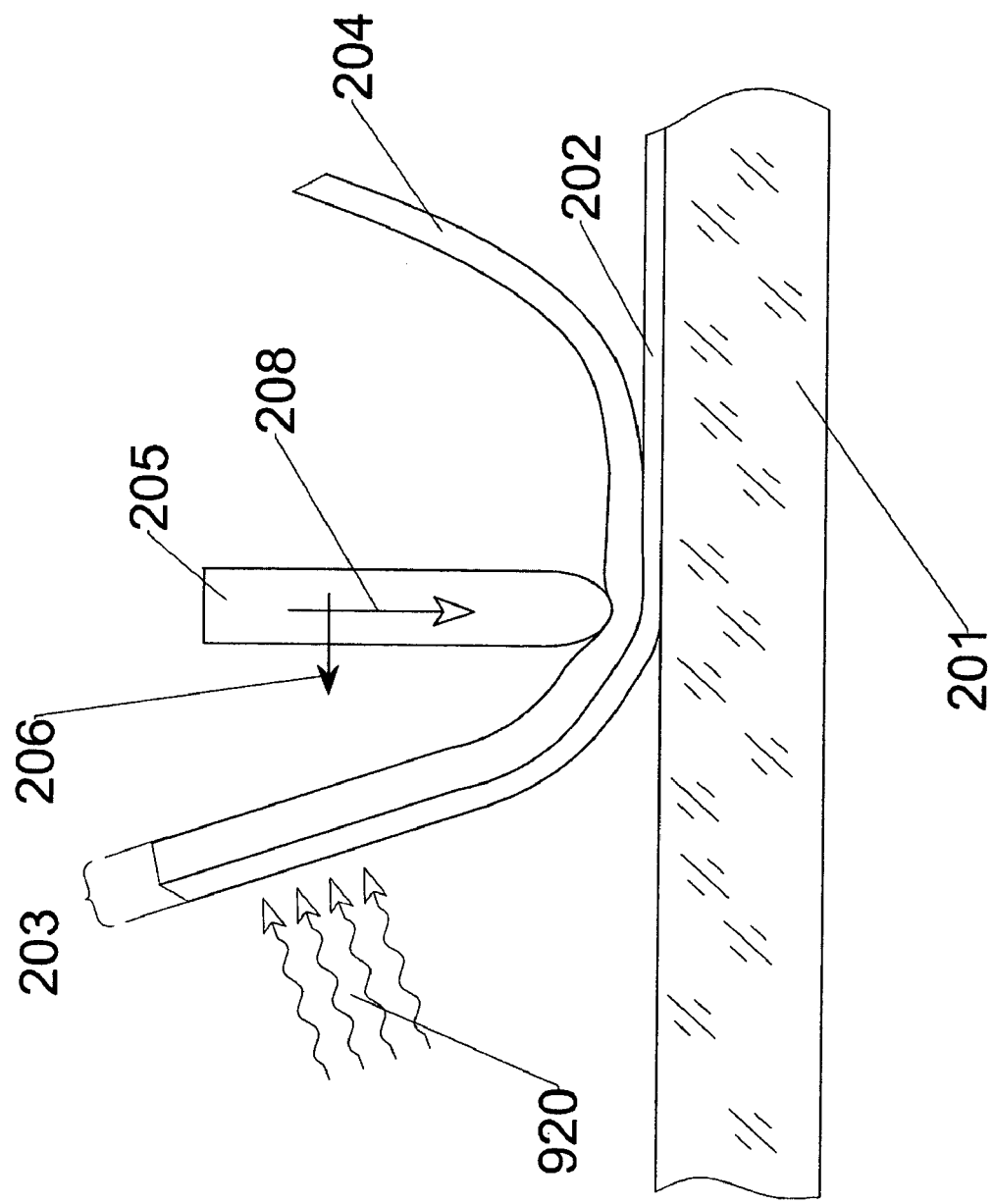
FIG. 9 schematically shows a fabrication method wherein the surface of a donor is pretreated according to one embodiment of the invention.

FIG. 9 schematically shows the pretreatment of the surface of the anisotropic crystal film, and the wave-shaped arrows 920 designate any of the described pretreatment applied to the surface of the anisotropic crystal film 202.

The pre-treatment shown in FIGS. 8 and 9 is schematically shown on the basis of the embodiment illustrated in FIG. 2 for the illustration purpose only, and the pre-treatment stage is not restricted to any particular embodiment disclosed herein but can be used with any of the embodiments disclosed.

The pretreatment of at least a portion of the surface of the base film before the application of the anisotropic crystal film is used to make a delamination easier. One or more of the described procedures can be employed in the pre-treatment such as ion bombardment, vacuum cleaning, heating, mechanical treatment, electromagnetic irradiation, washing, and chemical modification.

The pretreatment with the compressive stress is one embodiment of the disclosed invention. The preliminary exposure of the united donor and receptor under the compressive stress increases the adhesive bonding between the anisotropic crystal film and the receptor. Therefore, it is desirable to compress the donor and receptor after the placement of the donor and receptor in contact, and before the transfer of the anisotropic crystal film.

Figure 10:
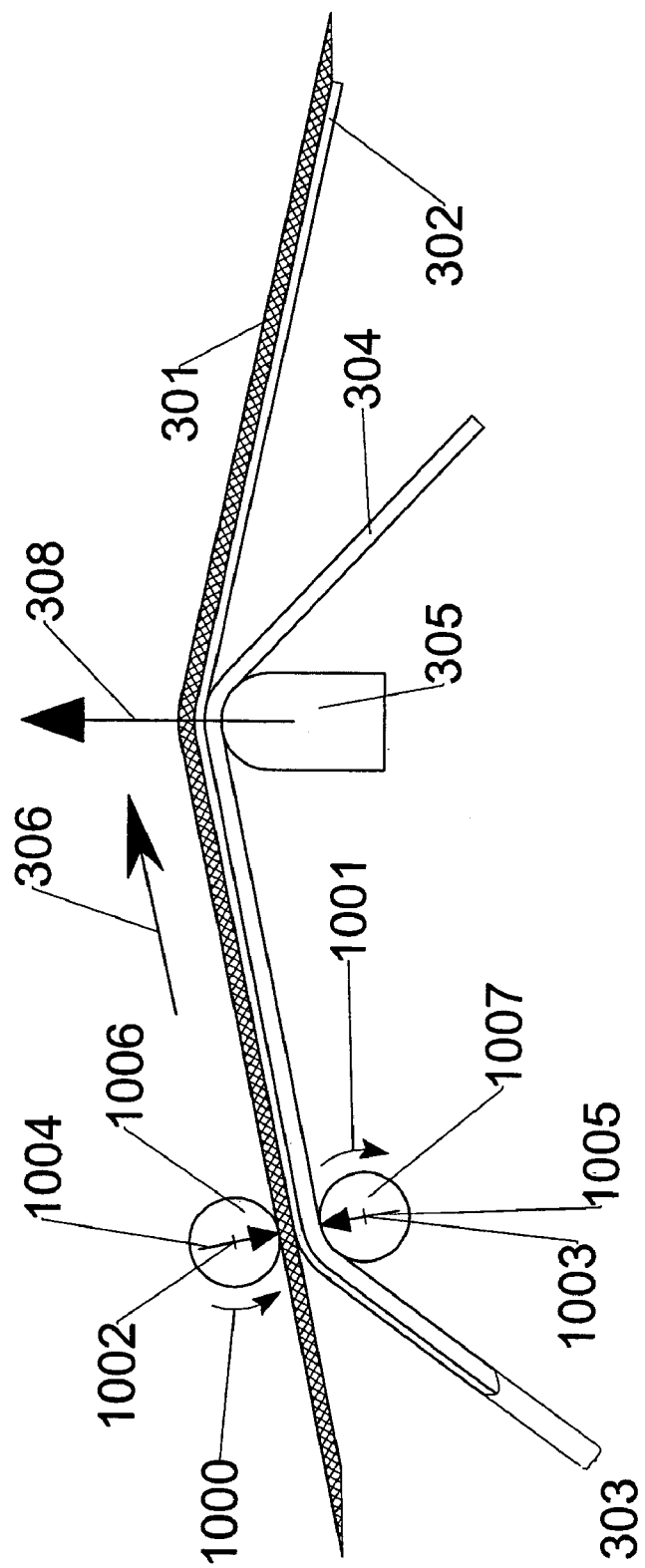
FIG. 10 schematically shows pretreatment of the donor and receptor with a compressive stress according to one embodiment of the invention.

An example of the described embodiment comprising the pretreatment using the compressive stress is schematically shown in FIG. 10. The transfer of the anisotropic crystal film 302 from the donor 303 to the receptor 301 is performed using the knife 305, and the donor 303 and receptor 301 are moved in the direction 306. The preliminary press of the donor 303 and the receptor 301 is performed using the pair of rolls 1006 and 1007. The rolls 1006 and 1007 are installed in front of the knife 305 with respect to the movement direction 306; therefore the compressive pretreatment is performed before the transfer. The rolls 1006 and 1007 freely rotate in the directions 1000 and 1001, around the axes 1002 and 1003, respectively. The free rotation of the rolls 1006 and 1007 is desirable to obtain the pure compressive loading of the receptor 301 and the donor 303 without shear stress. The compressive stress is obtained with the forces 1004, 1005 applied to the axes 1002, 1003 of each roll 1000 and 1001, respectively.

The anisotropic crystal films possess birefringence. The c-axis is the principal optical axis of the uniaxial birefringent material. If the c-axis is coincident with the light path, then the light is not spitted into two rays. In one embodiment of the invention, the anisotropic crystal film possesses a number of the birefringent fragments, wherein the direction of the c-axes differ with respect to the fragment. In one embodiment, the birefringent anisotropic crystal film possesses dichroism and performs as a polarizer. In this embodiment, the anisotropic crystal film possesses a number of polarizing fragments, wherein the direction of transmission axes differ with respect to the fragment.

Figure 11:
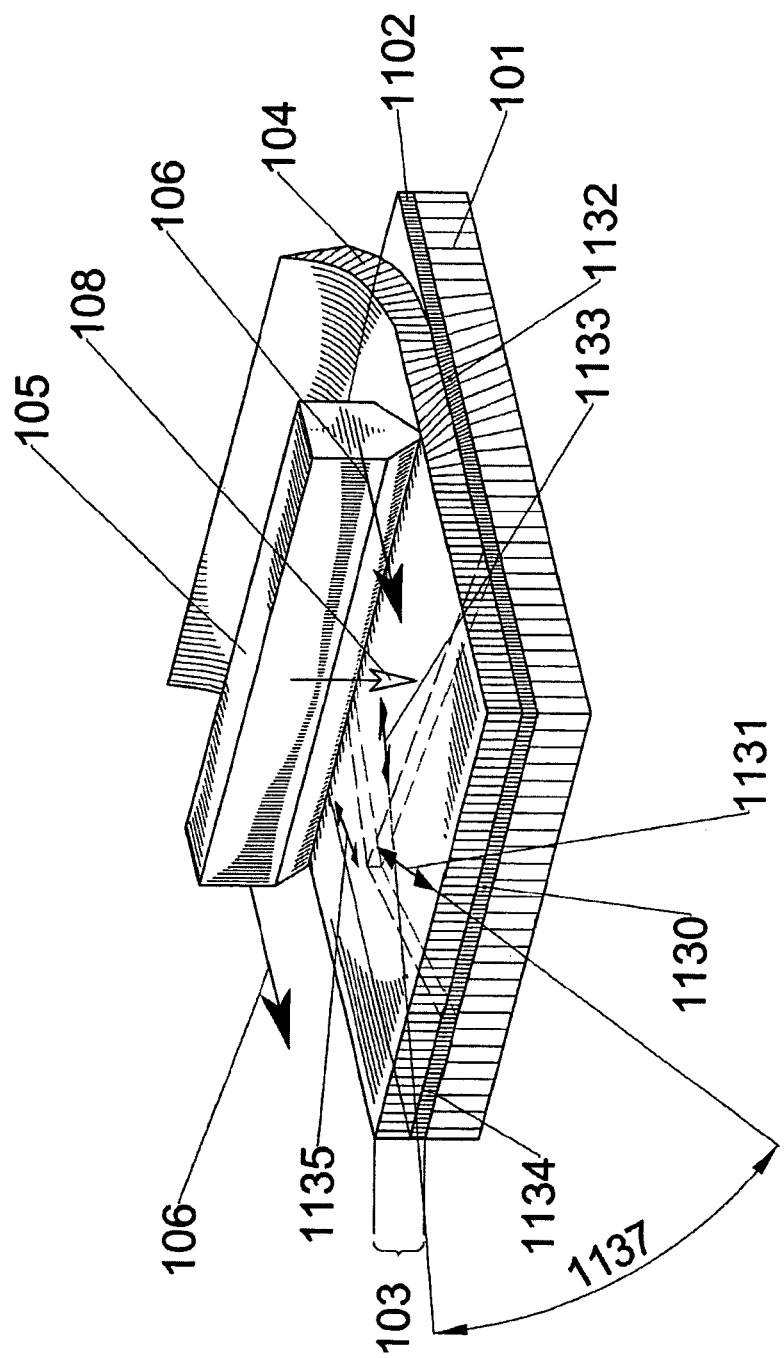
FIG. 11 schematically shows an anisotropic crystal film comprising fragments with various directions of polarization transmission axis according to one embodiment of the invention.

FIG. 11 schematically shows the transfer of the anisotropic crystal film 1102 from the donor 103 to the receptor 101, wherein the anisotropic crystal film 1102 is situated on base film 104, and the anisotropic crystal film 1102 possesses three fragments 1130, 1132, and 1134 with various directions of the transmission axes. The thin dashed lines shows the boundaries between the fragments 1130, 1132, 1134 of the anisotropic crystal film 1102. The transmission axis of each fragment is shown with the arrows 1131, 1133, 1135 for the fragments 1130, 1132, 1134, respectively. The angle 1137 between the transmission axes 1131 and 1133 is shown as an example of the angle between transmission axes of two fragments. The angle 1137 takes on any value in the range from 0 degree to 90 degree.

Figure 12:
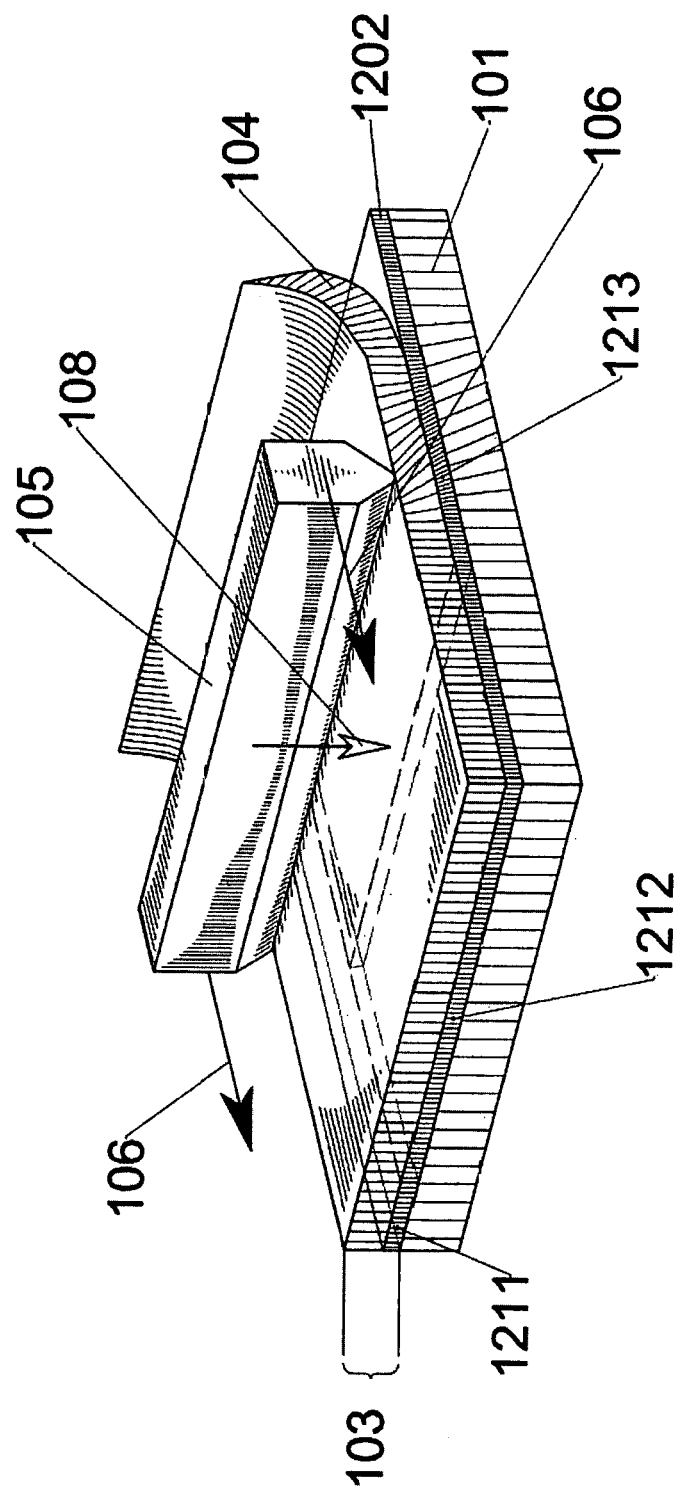
FIG. 12 schematically shows an anisotropic crystal film with colored fragments according to one embodiment of the invention.

In one embodiment, the anisotropic crystal film comprises the colored fragments in the desirable embodiment. FIG. 12 schematically shows the transfer of the anisotropic crystal film 1202, wherein the anisotropic crystal film possesses three fragments with various colors, which are situated on the base film 104. The thin dashed lines shows the boundaries between the fragments 1211, 1212, and 1213 of the anisotropic crystal film 1202. For example, the fragments 1211, 1212, and 1213 can be of red, green and blue colors, respectively, and comprise the RGB combination employed in the video displays.

In one embodiment, the anisotropic crystal film comprises thin crystal films due to the possibility of disposition on the variety of surfaces, and other exceptional properties—the low thickness, the thermal stability of the film and of the film optical properties, the high dichroic ratio, etc. See for example, U.S. Pat. No. 6,563,640, the disclosure of which is hereby incorporated by reference in its entirety. The described exceptional properties are associated with the technology of thin crystal film manufacturing. The technology was developed by the Optiva™ Inc., San-Francisco, USA.

Thin crystal film is based on the polycyclic organic compounds. An example of the desirable polycyclic organic compound is the dichroic dye, or the mixture of dichroic dyes. In one embodiment the thin crystal film is the partially crystal film formed by rodlike supramolecules of the polycyclic organic compound, and the polycyclic organic compound possesses conjugated π-systems. The thin crystal film possesses birefringence when the axes of the rodlike supramolecules aligned in parallel to the birefringence c-axis. In another embodiment, the birefringent thin crystal film possesses dichroism and performs as a polarizer.

At least one polycyclic organic compound can be used whose formula contains at least one ionogenic group, providing solubility in polar solvents, and/or at least one nonionogenic group, providing solubility in nonpolar solvents, and/or at least one counterion that either remains or does not remain in the structure of the molecule during preparation of the material. When such organic compound is dissolved in an appropriate solvent, a colloid system is formed (a lyotropic liquid crystal). In the colloid system, molecules are associated in supramolecular complexes which form kinetical units of the system (WO 01/63346). A liquid crystalline phase is a pre-ordered state of the system, which determines the initial anisotropy of the material. In the process of alignment of supramolecules and in the course of subsequent removal of the solvent, a solid crystal film possessing optical anisotropy (e.g., dichroism) is formed.

It is also possible to mix colloid systems (in this case, mixed supramolecules will be formed in a solution) to obtain crystal films with intermediate optical characteristics. In optically anisotropic dichroic crystal films obtained from mixtures of colloid solutions, absorption and refraction may be characterized by different values in the ranges determined by initial components. Mixing different colloid systems with the formation of mixed supramolecules is possible due to the coincidence of one of molecular dimensions (interplanar distances) of various organic compounds (3.4±0.3 Å).

Surfaces, on which the crystal films are deposited, may be subjected to additional treatment to provide uniform wettability thereof (to provide for hydrophilic properties of the surface). This may be mechanical treatment, annealing, and mechanochemical treatment. Similar treatment can also facilitate decreasing the film thickness and increasing the degree of molecular ordering. Furthermore, to increase the ordering in the film at the surface of a substrate, aligning anisotropic structures can be formed by mechanical treatment of the substrate surface.

In one embodiment of the invention, the transfer stage and the placement stage do not intersect in the time of realization. Once the sheet of the donor has been placed in contact with the receptor over the all area of the donor, the transfer of the anisotropic crystal film is started. This realization is advantageous as regards to the simplicity of the process and equipment of the fabrication, and can be easily realized over the relatively small sheets of the donor and receptor.

The described embodiment is shown schematically in FIG. 1. FIG. 1A shows the placement of the entire donor 103 into the contact with the receptor 101. FIG. 1B shows the transfer stage after the placement stage. Therefore the transfer stage (FIG. 1B) is separated in time from the placement stage (FIG. 1A).

In another embodiment, the transfer stage and placement stage intersect in the time of realization. The transfer of the anisotropic crystal film is performed over the portion of the donor, which has been already placed in contact with the receptor. This realization is advantageous with respect to the output of the process, and is desirable for the large sheets of the donor and receptor.

The embodiment of this kind is shown in FIG. 2. Here the transfer of the anisotropic crystal film 202 is performed simultaneously with the stage of placement the donor 203 and receptor 201 in contact.

Figure 13:
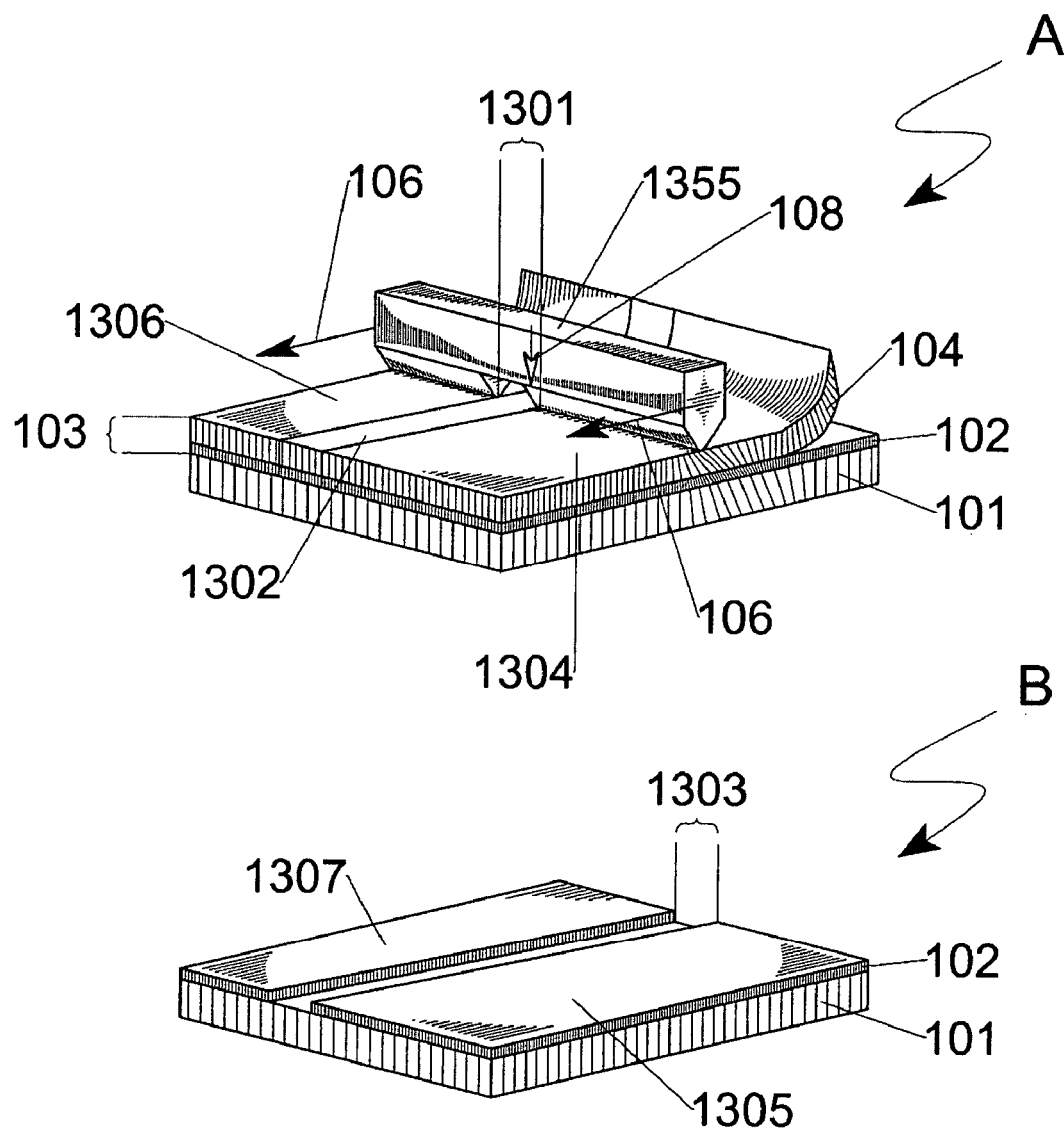
FIG. 13 schematically shows shear and compressive stresses applied to a portion of a donor according to one embodiment of the invention.

In another embodiment, the loading that causes compressive and shear stresses is applied only to desirable portion of the donor, and only this applied portion of the anisotropic crystal film is transferred from the donor to the receptor. FIG. 13 schematically shows an example where the loading is applied to only portion of the donor.

FIG. 13A shows the partial transfer with the use of the loading device of the knife type. The knife 1355 comprises a gap 1301 on the edge. The portion 1302 of the base film 104 is placed under the gap 1301 during the movement 106 of the knife 1355. This portion 1302 of the base film 104 and of the donor 103 is not subjected to the loading. Thus the portion of the anisotropic crystal film 102, which underlies the portion 1302 of the base film 104, is not transferred to the receptor 101. The portions 1304 and 1306 of the base film 104 and respective underlying portions of the anisotropic crystal film 102 are subjected to loading produced by the knife 1355. Thus the corresponding portions of the anisotropic crystal film 102 are transferred from the donor 103 to the receptor 101.

FIG. 13B shows the anisotropic crystal film that has been transferred to the receptor 101 as shown in FIG. 13A. The base film 104 is not shown for illustrative purposes. The portions 1305 and 1307 of the anisotropic crystal film 102 underlie the respective portions 1304 and 1306 in FIG. 13A, and the loadings are applied to the portions 1305 and 1307. Therefore the portions 1305 and 1307 of the anisotropic crystal film 102 are fixed in the receptor 101. Otherwise, the empty strip 1303 corresponds to the portion 1302 of the base film in FIG. 13A. In turn, the portion 1302 underlies the edge gap of the knife 1355 in FIG. 13A. This portion of the anisotropic crystal film 102 is not transferred since the loading is not applied to the respective portion of the donor 103.

The shear stress produces the delamination of the base from the anisotropic crystal film. Therefore, the base is removed immediately after the transfer of the anisotropic crystal film.

Figure 14:
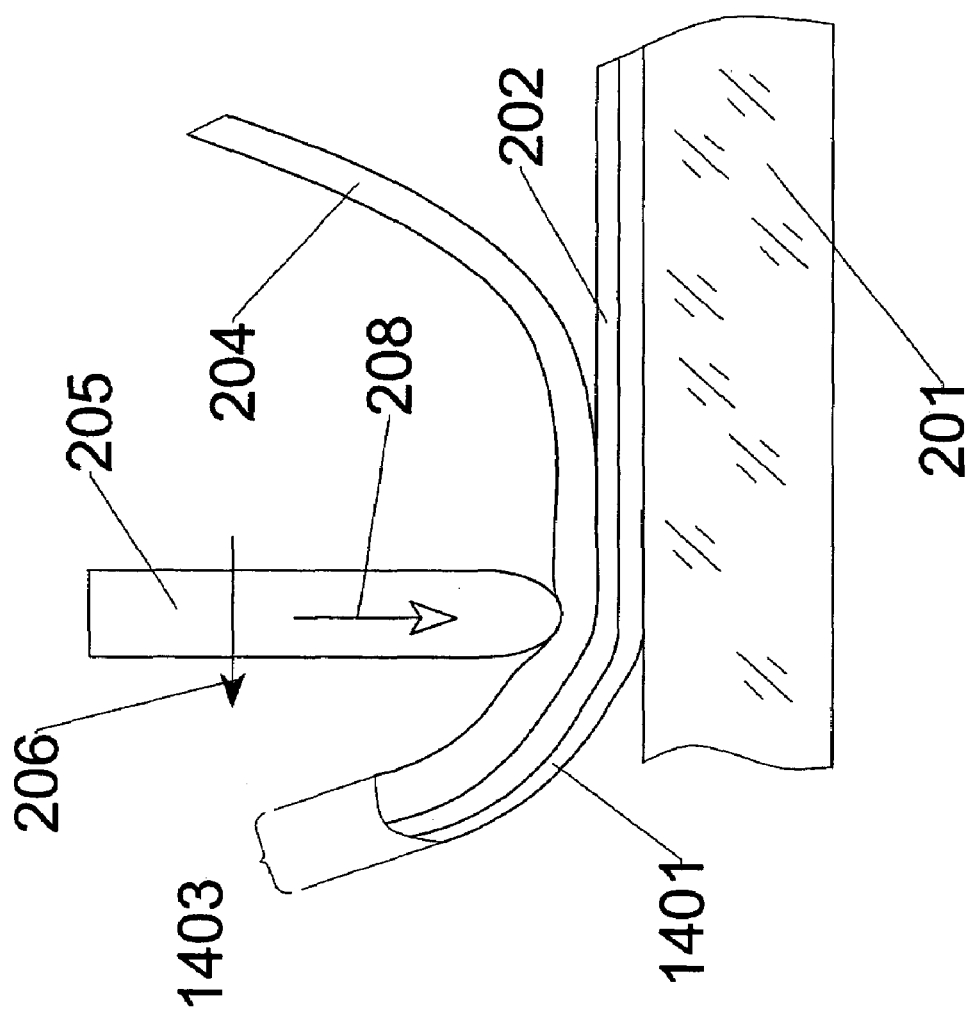
FIG. 14 schematically shows a fabrication method using a donor comprising an adhesive material according to one embodiment of the invention.

Adhesive materials can be employed in the method of the disclosed invention as well. The use of the adhesives and pressure sensitive adhesives facilitates the transfer. In the embodiment the donor comprises the additional film of the adhesive material placed on the external side of the anisotropic crystal film. In one embodiment said adhesive is pressure-sensitive. FIG. 14 schematically shows the embodiment, wherein the adhesive film 1401 is used with the donor 1403. The adhesive film 1401 covers the external surface of the anisotropic crystal film 202.

Figure 15:
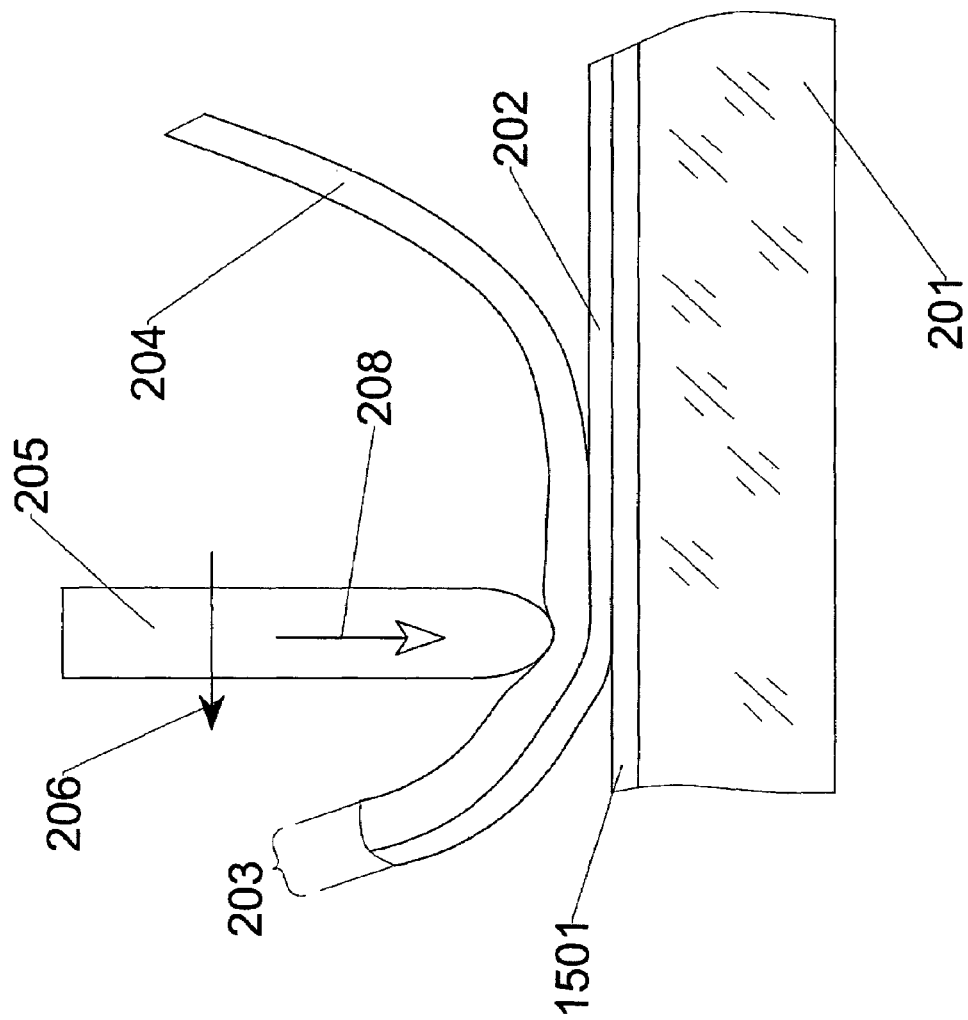
FIG. 15 schematically shows a fabrication process wherein a receptor comprising an adhesive material is used according to one embodiment of the invention.

In another embodiment, the receptor comprises the additional film of the adhesive material placed on the external side of the receptor. In one embodiment said adhesive is pressure-sensitive. FIG. 15 schematically shows the embodiment having the receptor 201 with the adhesive film 1501. The adhesive film 1501 covers the surface of the receptor 201 facing the anisotropic crystal film 202.

Figure 16:
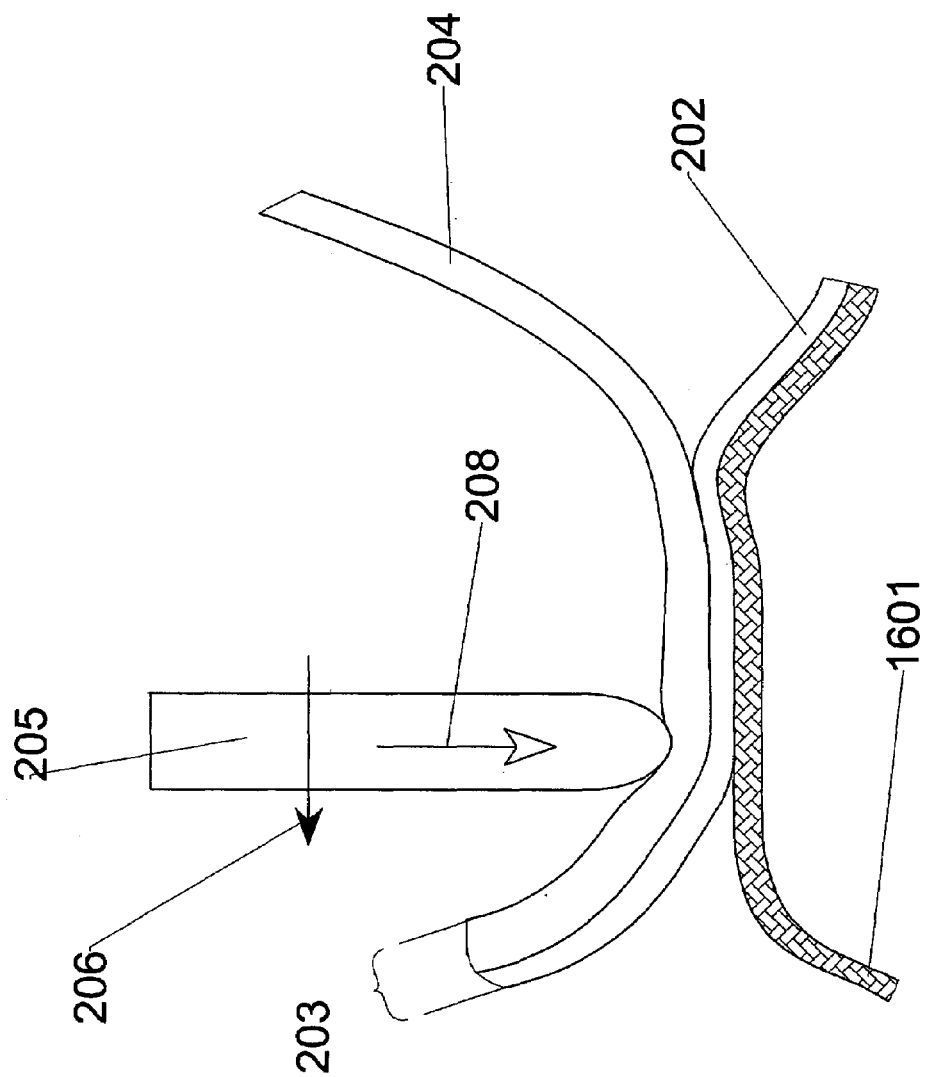
FIG. 16 schematically shows the transfer of an anisotropic crystal film to a curved receptor according to one embodiment of the invention.

Yet another embodiment comprises a curved or flat receptor. FIG. 16 schematically shows the example of the embodiment, wherein the anisotropic crystal film 202 is transferred from the donor 203 to the curved receptor 1601.

The fabrication method disclosed in the invention is desirably used for the fabrication of the multilayer films. The desirable layers include anisotropic crystal film layers, protective layers, adhesive layers, fluorescent layers, planarization layers, diffusive layers, light-scattering layers, reflective layers, alignment layers, electrical isolation layers, conducting electrode layers, substrate layers, liquid crystal layers, etc. The fabrication method disclosed in the invention is even more desirably used to obtain the multilayer anisotropic crystal film of given thickness, when the each layer is the anisotropic crystal film, possesses the selected thickness, and the optical properties of the layers are the same, and the crystallographic axes of the anisotropic crystal film layers are identically oriented. The embodiments related to the multilayer films are described hereinafter.

Figure 18:
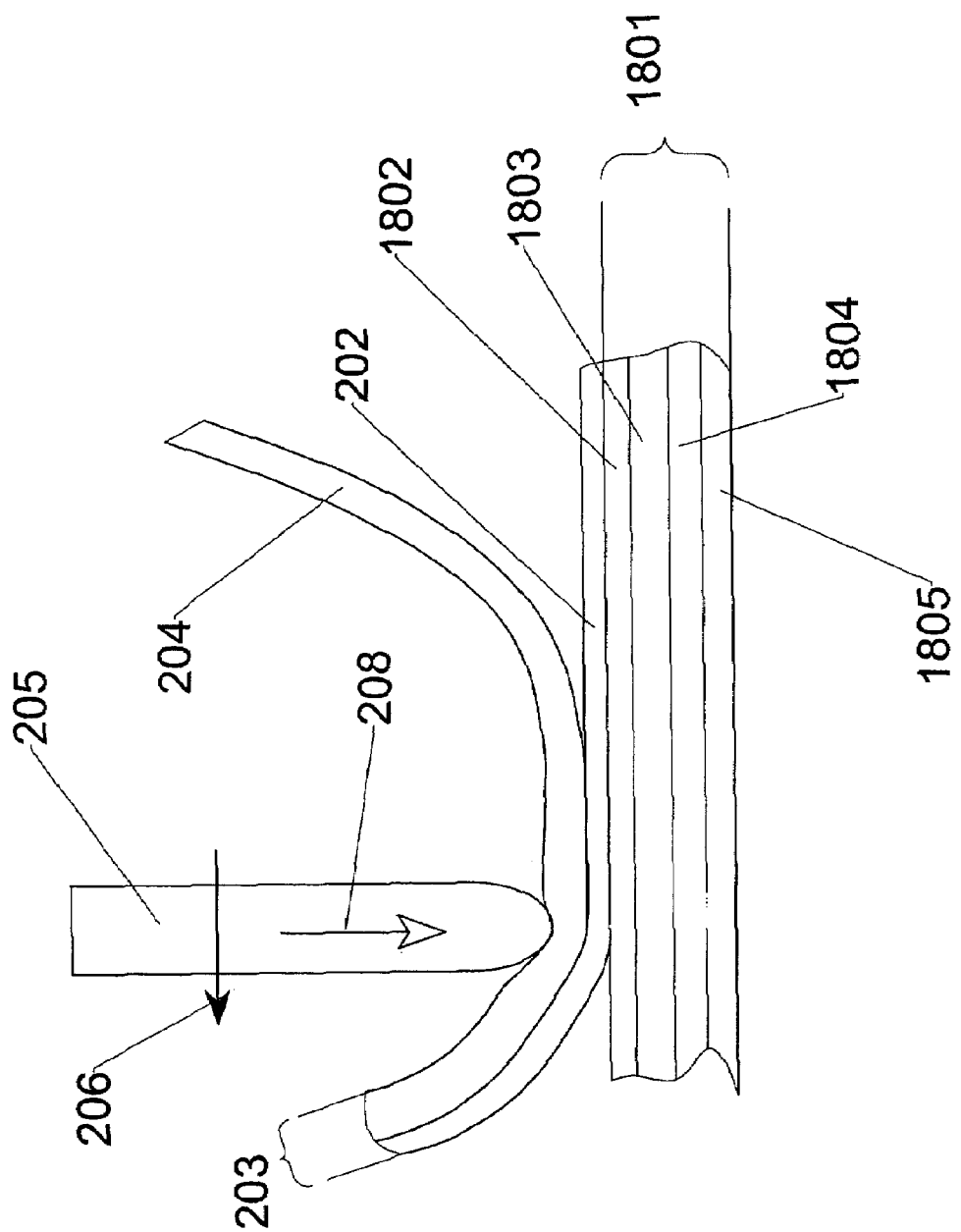
FIG. 18 schematically shows the transfer of a multilayer film from a donor to a receptor according to one embodiment of the invention.

In one embodiment, the receptor comprises multiple layers. FIG. 18 schematically shows the described embodiment. The anisotropic crystal film 202 is transferred from the donor 203 to the receptor 1801 and the receptor 1801 comprises multiple layers 1802, 1803, 1804 and 1805. For example, the layer 1802 is a protective layer, the layer 1803 is an anisotropic crystal film layer, the layer 1804 is a fluorescent layer, and the layer 1805 is a planarization layer. Each layer 1802, 1803, 1804 and 1805 is preferably formed using the transfer method disclosed in the invention.

In another embodiment, the multilayer film is transferred from the donor to the receptor. The multilayer film comprises at least one layer of the anisotropic crystal film layer, and the base placed on the external surface of the multilayer film. Additional desirable layers include anisotropic crystal film, protective layers, adhesive layers, fluorescent layers, planarization layers, diffusive layers, light-scattering layers, reflective layers, alignment layers, electrical isolation layers, conducting electrode layers, substrate layers, liquid crystal layers, etc.

Figure 17:
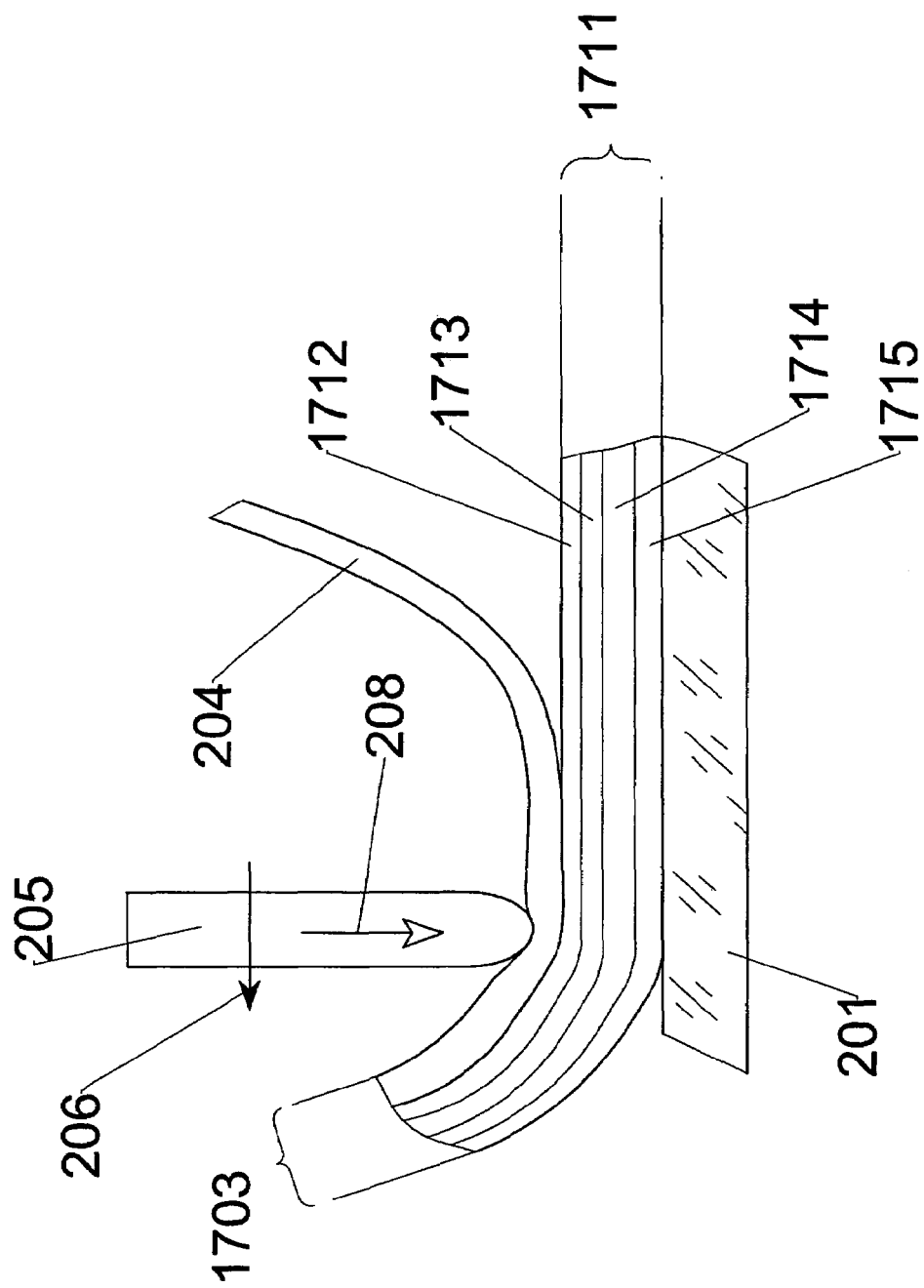
FIG. 17 schematically shows a receptor comprising a number of additional layers according to one embodiment of the invention.

FIG. 17 schematically shows the transfer of the multilayer film 1711 with multiple layers 1712, 1713, 1714, and 1715 from the donor 1703 to the receptor 201. For example, the multilayer film 1711 is an anisotropic crystal film 1713 with additional layers, the layer 1712 is an adhesive layer, the layer 1714 is a conductive electrode layer, and the layer 1715 is a diffusive layer.

Various materials can be employed as a receptor in the embodiments of the disclosed invention. examples of materials used for the receptor included polymer material, glass, ceramic, and metal. Yet in another embodiment, the receptor can be made of materials such as but not limited to semiconductors, dielectrics, and conducting materials.

Yet another embodiment is the one comprising the base made of polyethylene terephthalate (PET) due to the desirable elastic properties of the material.

The donor may comprise additional layer positioned between the anisotropic crystal film and the base. The adhesion of the additional layer at the boundary with the anisotropic crystal film is weak enough with respect the shear stress. In the embodiment of the donor the shear stress from any known source is used. In the embodiment of the method, the use of the layer facilitates the transfer due to the small resistance to the shear stresses applied in the transfer stage of the disclosed method.

The foregoing descriptions of specific embodiments of the invention have presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

What is claimed is:

1. A method of forming an anisotropic crystal film, comprising:
   providing a donor comprising a base and at least one anisotropic crystal film;
   providing a receptor,
   placing at least a portion of the anisotropic crystal film in contact with the receptor; and
   applying a loading to at least a portion of the base, whereby providing distribution of shear and compressive stresses onto the donor and receptor, and transferring at least a portion of the anisotropic crystal film onto the receptor and delaminating the at least portion of the anisotropic crystal film from the base wherein the loading is applied by a knife with a round blade which is provided with a pre-determined gap on the edge of the rounded blade, whereby the portion of anisotropic crystal film between the gap and the receptor is not applied with loading and is not transferred to the receptor.

2. The method of claim 1 wherein the applied loading is controlled so that the crystalline structure of the anisotropic crystal film transferred from the donor to the receptor is undisrupted.

3. The method of claim 1 wherein the anisotropic crystal film is formed by rodlike supramolecules comprising at least one polycyclic organic compound with conjugated π-systems.

4. The method of claim 3 wherein the polycyclic organic compound contains heterocycles.

5. The method of claim 3 wherein the anisotropic crystal film possesses dichroism.

6. The method of claim 1 wherein the anisotropic crystal film has an intermolecular spacing of 3.4±0.3 Å in the direction of one of main optical axes.

7. The method of claim 1 wherein the anisotropic crystal film is made of a material capable of forming a lyotropic liquid crystal.

8. The method of claim 1 wherein the receptor is made of a material selected from the group consisting of polymers, semiconductors, glasses, ceramics, metals, dielectrics, and any combinations thereof.

9. The method of claim 1 comprising a step of pre-treating at least a portion of the surface of the receptor before the placing step.

10. The method of claim 9 wherein said pre-treating step is performed by a method selected from the group consisting of ion bombardment, corona discharge, vacuum cleaning, heating, mechanical treatment, electromagnetic irradiation, chemical modification, and any combination thereof.

11. The method of claim 10 wherein the pretreatment ensures condition that adhesion of the crystal film to the receptor is greater than adhesion of the crystal film to the base film.

12. The method of claim 1 wherein the donor further comprises an adhesive layer situated on top of the anisotropic crystal film.

13. The method of claim 12 wherein the adhesive layer comprises a pressure sensitive material.

14. The method of claim 1 wherein the receptor further comprises an adhesive layer on at least a portion of the receptor.

15. The method of claim 14 wherein the adhesive layer comprises a pressure sensitive adhesive material.

16. The method of claim 1 wherein the donor further comprises interference multilayer structure.

17. The method of claim 1 wherein the donor further comprises a layer selected from a group consisting of protective layers, adhesive layers, fluorescent layers, planarization layers, diffusive layers, light-scattering layers, reflective layers, alignment layers, electrical isolation layers, conducting electrode layers, substrate layers, liquid crystal layers, and any combination thereof.

18. The method of claim 1 wherein the receptor comprises a flat surface.

19. The method of claim 1 wherein the receptor comprises a curved surface.

20. The method of claim 1 wherein the loading is applied to provide the shear stress along the interface of the donor and the receptor.

21. The method of claim 1 wherein the loading is applied to provide the shear stress along the main optical axis of the anisotropic crystal film.

22. The method of claim 1 wherein the anisotropic crystal film comprises at least two fragments and the optical axes of the two fragments form an angle in the range of about 0 to 90 degree.

23. The method of claim 1 wherein the anisotropic crystal film comprises at least two fragments of different colors.

24. The method of claim 1 wherein the loading is applied to the entire base, whereby transferring the entire anisotropic crystal film onto the receptor.

25. The method of claim 1 wherein the placing and loading step are performed substantially simultaneously.

* * * * *